March 14, 1967 W. A. HURT, JR 3,308,727
SUPPORT FOR MANHOLE COVER AND THE LIKE
Filed April 8, 1964

INVENTOR.
WILLIAM A. HURT, JR.
BY
Teare, Fetzer & Teare
ATTORNEYS

United States Patent Office 3,308,727
Patented Mar. 14, 1967

3,308,727
SUPPORT FOR MANHOLE COVER AND
THE LIKE
William A. Hurt, Jr., Highland Heights, Ohio, assignor to Central States Industrial Supply Company, Cleveland, Ohio, a corporation of Ohio
Filed Apr. 8, 1964, Ser. No. 358,195
3 Claims. (Cl. 94—34)

This invention relates in general to a support for a manhole cover, and more particularly to a wear-resistant, resilient support for convenient and ready disposition between a manhole cover and the like, and its supporting housing.

It is well known in the manhole art the manhole covers, catch basins, gratings and the like street castings or covers, which are removable, and which close manholes and like openings in a street, are subjected to heavy traffic. Such traffic causes considerable wear between the cover and the supporting flange of the manhole housing, and results in looseness and noise in the structural arrangement. The wear on the cover supporting flange of the housing may be of such an extent that the cover will fall completely down into the associated manhole, or the cover may be knocked out of the housing upon impact by passing traffic, resulting in a very dangerous situation.

Attempts have been made in the past to alleviate such wear on the cover and on the housing, and resultant dangerous conditions, by the use of a gasket, such as a rubber gasket, between the housing and the cover. However, such prior art gaskets have generally not been completely satisfactory, and usually wear rapidly, resulting in the rapid deterioration thereof, and necessitating continual inspection and replacement thereof. Moreover, such prior art gaskets have generally been unduly expensive, and have not found wide favor in the manhole cover field.

The present invention provides a novel cushioning device for interposition between the cover and the manhole housing, which has good wear resistant characteristics, thereby eliminating the heretofore rapid deterioration of the cushioning device, which has good operating characteristics so as to provide a highly effective cushion or buffer between the cover and the housing, and which is of a highly simplified and economical construction, so as to make the device highly desirable from an economic standpoint.

Accordingly, an object of the invention is to provide a novel cushioning device for use between a street cover or manhole cover, and a housing supporting such cover.

Another object of the invention is to provide a novel cushioning device for disposal between a manhole cover and a manhole housing, and which cushioning device comprises a hollow, resiliently compressible member, which is of elongated, strip-like configuration, and which possesses sufficient flexibility to be formed into whatever configuration of housing device used therewith.

A still further object of the invention is to provide a manhole arrangement including a housing, for supporting the cover on the manhole, and wherein a novel cushioning device comprising an extruded plastic hollow member of somewhat resiliently compressible material, is disposed between the cover and the supporting flange of the housing for eliminating wear between the housing and the cover, and wherein the hollow member embodies sufficient flexibility so that it may be generally conformed to whatever configuration is possessed by the associated supporting flange of the housing, so that such cushioning device may be assembled thereon.

A further object of the invention is to provide a novel long wearing cushioning device for effectively cushioning the cover of a manhole arrangement, and wherein the cushioning device is of extruded hollow plastic configuration, and wherein it can be readily assembled into a manhole housing, and which obviates the wear and maintenance problems that have persisted in the manhole art.

Other objects and advantages of the invention will be apparent from the following description taken in conjunction with the accompanying drawings wherein.

Figure 4:
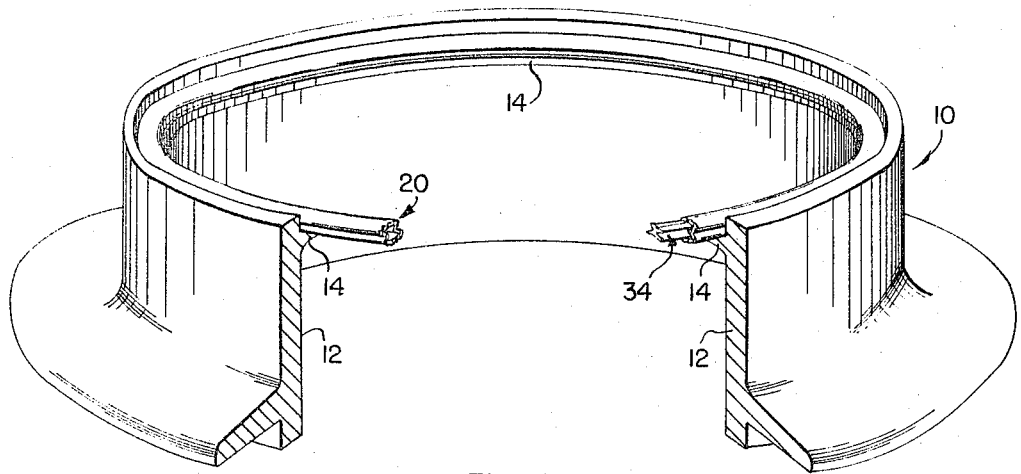
FIG. 4 is a generally perspective, partially broken view illustrating the cushioning device of the invention as mounted in a manhole housing, and illustrating the plug member which is adapted to connect the confronting ends of the piece of cushioning device together, when the latter is in installed condition in the manhole housing.

Referring now again to the drawings, 10 designates a conventional manhole housing generally provided in the form of a casting an having side wall portions 12. While the housing has been shown of circular configuration (FIG. 4) it will be understood that other configurations of housings are also known in the manhole art, such as for instance a rectangular shaped casting for use with rectangular shaped manhole covers.

Disposed on the interior of the housing is an inwardly extending flange portion 14 adapted for supporting a conventional manhole cover 16 thereon. As can be best seen from FIG. 2 of the drawings, the cover of the manhole embodies a peripheral shoulder 18 which is adapted to overlap flange 14 on the housing.

Figure 1:
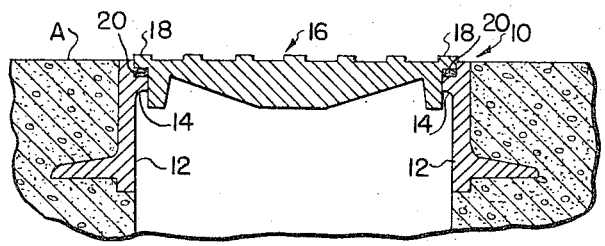
FIG. 1 is a vertically sectioned, generally diagrammatic illustration of a manhole arrangement embodying the instant arrangement.

Now in accordance with the instant invention there is provided a novel cushioning device 20 interposed between the flange 14 on the housing and the shoulder 18 on the cover, for generally resiliently supporting the cover in proper position in the housing, and for preventing or reducing wear between the housing and the cover. The cushioning device is preferably of such thickness that the cover in the normal cover supporting condition of the cushioning device, will extend substantially flush with the street level A (FIG. 1) in which the manhole housing 10 is located.

Figure 3:
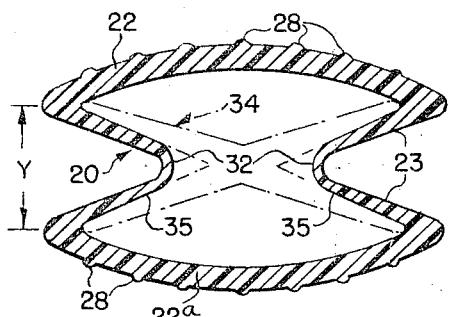
FIG. 3 is an enlarged sectional view of the cushioning device per se.

Such cushioning device comprises an elongated, hollow, strip-like member having top and bottom walls 22, 22a, respectively, connected by bellows-like side walls 23 which define the side extremities of the elongated member. The cushioning member is preferably formed of a generally tough material, which possesses good wear resistance characteristics, but which also possesses sufficient resiliency so that upon application of force to the top or bottom walls 22, 22a of the cushioning member, the side walls 23 are flexed to provide "give" to the cushioning member. The cushioning device preferably comprises comparatively thick top and bottom walls as shown, with the comparatively thinner side or lateral walls, so that upon application of predetermined force to the top or bottom wall, the force is dissipated primarily by the flexure of the side walls. Also such top and bottom walls are preferably outwardly bowed as shown, and preferably have on their exterior surfaces a plurality of protuberances 28 thereon, or are corrugated lengthwise thereof, for a purpose to be hereinafter described. As can be best seen from FIG. 3, the side walls 23 at their junctures with the top and bottom walls are of thickened construction, and from their taper down to the approximate vertical center 32 of the side walls.

The cushioning member is formed in generally strip form from preferably an extrudible plastic material which has some give or resiliency so that it will provide for cushioning of the cover upon a force being applied thereto, but which possesses sufficient wear-resistant characteristics that it will give a long service life when disposed in a manhole housing. A suitable material has been found to be the polymer, polypropylene. Such plastic material, which is of high molecular weight and highly crystalline, is preferably extruded in a continuous elongated piece, and may be wound for instance upon a drum or the like, for ready transportability of the material. While this tough, high-molecular weight, substantially isotactic polymer is preferred, it will be understood that other materials might be utilized. For instance some of the hard rubbers having a sufficiently high elastic modulus and a hardness, as measured by Shore Durometer, in a range of, for instance, 60 to 90, would be suitable.

When it is desired to install a cushioning device of the instant type in a manhole structure, the strip material can be unwound from the drum to any suitable length, and then may be readily cut as by means of a hacksaw, from the stock remaining on the drum.

Figure 2:
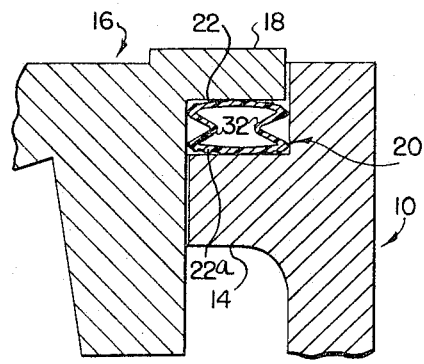
FIG. 2 is an enlarged fragmentary, vertical sectional view of the manhole arrangement shown in FIG. 1.
Figure 5:
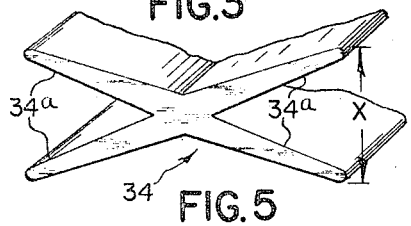
FIG. 5 is an enlarged end view of the connecting plug member illustrated in FIG. 4.

In order to insure stability for the cushioning device when installed on the laterally extending flange of the manhole housing, connecting means, such as an extruded or cast plastic end plug 34, is preferably provided for attaching confronting ends of the cushioning member together. Plug 34 may be inserted into the hollow ends of the cushioning tube 20 for holding such ends together, and into whatever configuration called for by the manhole housing. For instance, in the manhole housing illustrated in FIG. 3, the cushioning device is formed into a circular configuration when installed on the flange of the housing, which circular configuration is preferred for use with this product. The insert member or plug 34 is of a star or pronged configuration in end elevation, with the distance or maximum height X of the insert plug being preferably slightly less than the minimum interior height Y of the cushioning member, whereby the plug may be readily received in confronting ends of the cushioning member when it is, for instance, curved into a circular shape preparatory to insertion in the manhole housing. The width of plug 34 is also preferably slightly less than the maximum interior width of member 20 but the prongs 34a, are so arranged that they generally frictionally grip the respective inwardly directed projection 35 defined by the corrugated or bellows-like side walls. Thus the prongs 34a frictionally grip the confronting interior surfaces of the side walls of the cushioning device (FIG. 3) and hold the ends of strip member 20 together in abutting relation. The linear insert plug or coupler 34 is preferably of a comparatively small length such as for instance one to two inches, and is preferably also provided in strip form, and composed of polypropylene. As shown in FIG. 2, the cushioning device preferably extends laterally substantially the full width of the flange on the housing, and positions the top surface of the supported cover member substantially flush with the street level. The corrugated or roughened upper and lower surfaces of the cushioning member 20 aid in retaining the cushioning member in position on the flange 14, and aid in diminishing or preventing movement of the cover with respect to the cushioning member.

With such an arrangement it will be seen that when shock or pressure is applied to the cover of the manhole during for instance passage of traffic over the cover, the cover transmits such shock or pressure to the top wall of the cushioning device, causing a certain amount of deflection of primarily the thinner, somewhat resilient side walls 23 of the cushioning device, and the device is compressed. It will be seen that since the cushioning device is hollow, it contains air therein and since the confronting ends of the device are generally plugged by plug member 34 and held in generally surface-to-surface contact by such plug member, the air itself within the cushioning member 20 also acts somewhat as a cushion compression of the device somewhat decreasing the volume within the hollow cushioning member and causing forcing of some air out between the confronting end surfaces of the strip cushioning device. Upon removal of the deflecting force, the resiliency or elastic memory of corrugated or bellows-like walls 23 tends to cause expansion of member 20 back to uncompressed condition. Member 20 has excellent temperature variation resistance when formed of said polypropylene, being little effected by temperatures in a range of approximately between $-60°$ and $220°$ Fahrenheit.

From the foregoing description and accompanying drawings, it will be seen that the invention provides a novel cushioning device for use in manhole housing for cushioning impacts or forces applied by the cover of the manhole to the supporting flange of the housing, and in a manner to prevent undue wear on the housing flange and on the cover. It will also be seen that the invention provides a manhole arrangement including a cushioning device therein comprising a somewhat resilient hollow elongated flexible member which can be radily disposed in a manhole housing and which is highly economical to produce in strip form, and install in the manhole housing.

The terms and expressions which have been used are used as terms of description and not of limitation, and there is no intention in the use of such terms and expressions of excluding any equivalents of any of the features shown or described, or portions thereof, but is recognized that various modifications are possible within the scope of the invention claimed.

I claim:

1. A cushioning device for use in supporting a cover, such as a manhole cover, on a support member, said device comprising an elongated, resilient gasket member, said gasket member being of a hollow, substantially symmetrical shape in transverse cross-section including spaced, outwardly arched top and bottom walls, a pair of spaced, side walls integrally uniting and defining flexure regions between said top and bottom wall, said side walls each having converging planar portions which extend toward one another in a direction away from their respective junctures with the top and bottom walls to a line of union between said top and bottom walls, said planar portions being of a substantially greater thickness at their junctures with the respective top and bottom walls as compared to their thickness at the respective lines of union with the top and bottom walls, said gasket member having free ends adapted to be spliced together by a generally X-shaped resilient plug member insertable into said ends, said plug member having prong elements which frictionally engage the confronting interior surfaces of the side walls of said device in the inserted position for moving said ends in spliced relationship.

2. A cushioning device in accordance with claim 1, wherein the overall height of said plug member is slightly less than the minimum height of the interior of said device.

3. In combination, a manhole having a housing including a continuous inwardly extending flange portion, and a curved, in plan, resilient gasket member supported on said flange portion and adapted to resiliently support a manhole cover thereon for permitting movement of said cover toward and away from said flange portion, said gasket member comprising an extrusion of polypropylene and being of a hollow, substantially symmetrical shape in transverse section including spaced, outwardly arched top and bottom walls, a pair of spaced, side walls integrally uniting and defining flexure regions between said top and bottom walls, said side walls each having converging generally planar portions which extend toward one another in a direction away from their respective junctures with the top and bottom walls to a line of union between said top and bottom walls, said planar portions being of a substantially greater thickness at their junctures with the respective top and bottom walls as compared to the thickness at the respective lines of union with the top and bottom walls, said gasket member having free ends adapted to be spliced together by a generally X-shaped resilient plug member insertable into said ends, said plug member having prong elements which frictionally engage the confronting interior surfaces of the side walls for holding said ends in spliced relationship.

References Cited by the Examiner

UNITED STATES PATENTS

| | | | |
|---|---|---|---|
| 1,389,557 | 8/1921 | Een | 20—69 |
| 1,940,924 | 12/1933 | Taylor | 20—69 |
| 2,503,882 | 4/1950 | Medford | 20—69 |
| 2,736,076 | 2/1956 | Bush | 20—69 |
| 2,942,308 | 6/1960 | Naeser | 20—69 |
| 2,959,832 | 11/1960 | Baermann | 20—69 |
| 3,075,258 | 1/1963 | Petkwitz | 20—69 |
| 3,117,352 | 1/1964 | Reahard | 20—69 |

FOREIGN PATENTS

| | | |
|---|---|---|
| 443,634 | 2/1936 | Great Britain. |

JACOB L. NACKENOFF, *Primary Examiner.*